US010360642B2

(12) United States Patent
Greene et al.

(10) Patent No.: US 10,360,642 B2
(45) Date of Patent: Jul. 23, 2019

(54) GLOBAL COMMENTS FOR A MEDIA ITEM (71) Applicant: GOOGLE INC., Mountain View, CA (US)

(72) Inventors: Kevin Greene, San Francisco, CA (US); Justin Lewis, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 394 days.

(21) Appl. No.: 14/622,553

(22) Filed: Feb. 13, 2015

(65) Prior Publication Data

US 2015/0234887 A1 Aug. 20, 2015

Related U.S. Application Data (60) Provisional application No. 61/941,474, filed on Feb. 18, 2014.

(51) Int. Cl.
G06Q 50/00 (2012.01)
G06F 17/24 (2006.01)
H04L 12/58 (2006.01)

(52) U.S. Cl.
CPC .......... *G06Q 50/01* (2013.01); *G06F 17/241* (2013.01); *H04L 51/32* (2013.01)

(58) Field of Classification Search
None
See application file for complete search history.

(56) References Cited

U.S. PATENT DOCUMENTS

| 9,361,368 | B1* | 6/2016 | Patel | G06Q 50/01 |
| 2005/0209989 | A1* | 9/2005 | Albornoz | G06F 17/2235 |
| 2005/0256866 | A1* | 11/2005 | Lu | G06F 17/30867 |
| 2009/0043814 | A1 | 2/2009 | Faris et al. | |
| 2010/0070845 | A1* | 3/2010 | Facemire | G06F 17/241 715/230 |
| 2010/0325557 | A1* | 12/2010 | Sibillo | G06F 3/0481 715/751 |
| 2012/0005224 | A1 | 1/2012 | Ahrens et al. | |
| 2012/0151383 | A1 | 6/2012 | Kazan et al. | |

(Continued)

FOREIGN PATENT DOCUMENTS

| KR | 10-2010-0001317 | 1/2010 |
| KR | 10-2013-0026558 | 3/2013 |
| WO | 2013/177571 A1 | 11/2013 |

OTHER PUBLICATIONS

International Searching Authority, "Notification of Transmittal of the International Search Report and the Written Opinion of the International Search Authority, or the Declaration," for International Application No. PCT/US2015/016376, dated May 26, 2015, 11 pages.

(Continued)

*Primary Examiner* — Alex Gofman
*Assistant Examiner* — Umar Mian
(74) *Attorney, Agent, or Firm* — Lowenstein Sandler LLP (57) ABSTRACT Providing global comments for a media item is described. A computing device determines whether a media item is to be presented in a social share with comments from other social shares. In response to a determination that the media item is to be presented with the comments from the other social shares, the computing device obtains the comments from a data store using an identifier of the media item for presentation to a user.

17 Claims, 5 Drawing Sheets (56) References Cited

U.S. PATENT DOCUMENTS

| | | |
|---|---|---|
| 2012/0158753 A1 | 6/2012 | He et al. |
| 2012/0173508 A1 | 7/2012 | Zhou |
| 2012/0222061 A1* | 8/2012 | Anthru ............... H04N 5/44543 |
| | | 725/28 |
| 2012/0284343 A1* | 11/2012 | Lee ..................... G06Q 50/01 |
| | | 709/206 |
| 2013/0031455 A1* | 1/2013 | Griffiths ............... G06F 17/241 |
| | | 715/230 |
| 2013/0086077 A1* | 4/2013 | Piippo ................ G06Q 30/0259 |
| | | 707/748 |
| 2013/0185657 A1* | 7/2013 | Gunawardena ... G06F 17/30038 |
| | | 715/753 |
| 2013/0332511 A1 | 12/2013 | Hala et al. |
| 2013/0339443 A1* | 12/2013 | Goldman ............. H04L 65/403 |
| | | 709/204 |
| 2014/0136983 A1* | 5/2014 | Herold ................ G06Q 10/107 |
| | | 715/743 |
| 2014/0181694 A1* | 6/2014 | Barman ............... G06F 3/0484 |
| | | 715/753 |
| 2014/0282099 A1* | 9/2014 | Bronder ................ G06F 3/048 |
| | | 715/753 |
| 2014/0304618 A1* | 10/2014 | Carriero ............. H04L 12/1818 |
| | | 715/753 |
| 2015/0067739 A1* | 3/2015 | Kelley ............. H04N 21/47205 |
| | | 725/60 |
| 2015/0199809 A1* | 7/2015 | Nogawa ................ G06Q 50/02 |
| | | 382/110 |

OTHER PUBLICATIONS

European Extended Search Report dated Sep. 17, 2017, on application No. 15752477.8.

* cited by examiner

GLOBAL COMMENTS FOR A MEDIA ITEM

RELATED APPLICATION

This application is related to and claims the benefit of U.S. Patent Application No. 61/941,474, filed Feb. 18, 2014, the entirety of which is incorporated herein by reference.

TECHNICAL FIELD

Embodiments of the present disclosure relate to content delivery and, more particularly, to global comments for a media item.

BACKGROUND

On the Internet, content hosting platforms or other applications allow users to upload, view, and share media items or data content. Such media items or data content may include audio clips, movie clips, TV clips, and music videos, as well as content such as blogs, social media pages, short original videos, pictures, photos, articles, avatars, software programs, games, etc. Content hosting sites and social networking sites allow users to share media items or data content with other users as social shares (e.g., a feed item, post). The social shares can be presented to users in various feeds (e.g., social feed, news feed). A social share can include a reference to a media item or data content and typically includes its own set of comments that are specific to the social share. For multiple social shares that each include a reference to the same media item or data content, each of the social shares typically has its own set of comments.

SUMMARY

In one aspect, a method includes identifying a request for a media item to be shared. The method further includes determining, by a processing device, whether the media item is to be presented with a plurality of comments from a plurality of social shares. The method further includes in response to a determination that the media item is to be presented with the plurality of comments from the plurality of social shares, obtaining the plurality of comments from a data store using an identifier of the media item for presentation to a user. The method further includes receiving a new comment posted by the user. The method further includes submitting the new comment to the data store in association with the identifier of the media item.

In additional aspects, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various implementations of the disclosure.

DETAILED DESCRIPTION

Conventional content sharing services allow users to share media items with other users that result in the creation of social shares associated with the media items. A social share refers to content (e.g., post, feed item) resulting from a user sharing a media item (e.g., via a share request) via a social network or a content sharing service. A media item can be digital video, streaming video, an image, digital music, streaming music, a status update, a location of a user, etc. The content sharing service can present social shares to users in one or more feeds (e.g., social feeds, news feeds). The social shares can include references to media items (e.g., a URL that directs a viewing user to a hosted video). Conventionally, when multiple users share the same media item in different social shares, each social share is created as a different instance. Each social share instance typically includes its own set of comments. For example, user A can share a video in a post in a social network. Other users who are socially connected to user A can view the post, watch the video and add comments that are then included in user A's social share. User B can share the same video in a different post. Social contacts of user B can view user B's post, watch the video and add comments that are then included in user B's post. Each social share typically has a different set of comments so comments associated with user A's sharing of the video generally do not appear on the social share resulting from user B's sharing of the same video. Similarly, comments associated with user B's sharing of the video typically do not appear on the social share resulting from user A's sharing of the same video.

Aspects of the present disclosure address the above deficiencies of conventional systems by providing global comments for a media item. Global comments are referred to herein to aggregated comments from different social shares, where the aggregated comments pertain to the same media item(s). In some implementations, a global comment service is provided that can identify a request for a media item to be shared, determine that the media item is to be presented with comments from multiple social shares, and obtain these comments for presentation to a user, as will be discussed in more detail below. At any time, the global comment service can receive a new comment posted by a user, and associate the new comment with the media item. Techniques described herein can provide one set of comments from any number of social shares associated with the same media item(s). The global comment service can be implemented as part of a content platform. Alternatively, the global comment service can be implemented as part of a social network platform that interfaces with a content platform. Yet alternatively, the global comment service can be implemented in a system that combines functionality of both the social network platform and the content platform.

Although some aspects of the present disclosure are described with reference to video and/or pages, the present disclosure pertains to various types media content (e.g., video, audio, text, images, executable instructions, etc.) and/or various types of GUI documents (e.g., web pages, mobile app documents, etc.).

Figure 1:
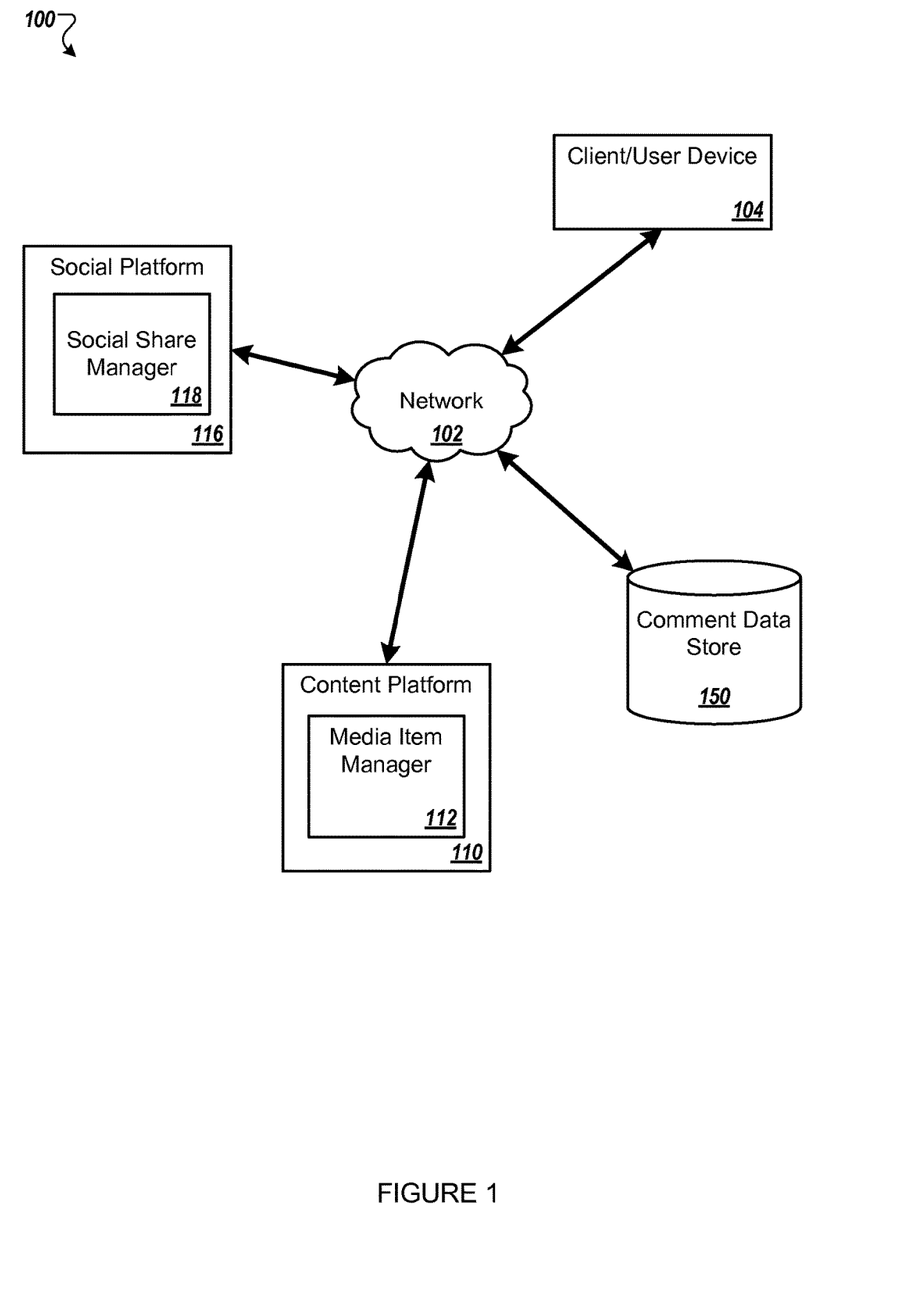
FIG. 1 illustrates an example system architecture 100, in accordance with one implementation of the present disclosure.

FIG. 1 illustrates an example system architecture 100, in accordance with implementations of the present disclosure. System 100 comprises a client/user device 104 in communication with (e.g., coupled to) a content platform 110, a social platform 116, and a data store 150 over a network 102. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 104 may be any type of computing device, for example, a device including a processor, a computer-readable medium, and a memory. In some implementations, the client/user device 104 may be executing a browser application or other application adapted to communicate over Internet related protocols (e.g., TCP/IP and HTTP) and/or display a user interface. While only a single client/user device 104 is shown in FIG. 1, system 100 may support a large number of concurrent sessions with many client/user devices 104.

The content platform 110 and the social platform 116 each may include one or more computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine.

In implementations, the social platform 116 is part of the content platform 110. In such implementations, the social platform 116 manages user interactions with content within the social platform 116. Alternatively, the social platform 116 can be separate from the content platform 110. In such implementations, when a user shares content of the content platform 110 on the social platform, the social platform 118 can interface with the content platform 110 to obtain global comments for the content.

Data store 150 can include one or more writable persistent storage devices, such as memories, tapes or disks. Data store 150 can include one or more comments that are associated with a media item. The comments can be indexed and can be accessed using a key. In implementations, the key is an identifier of the media item (e.g., a unique ID).

The content platform 110 can provide one or more shareable media items. To enable media item sharing, a media item manager 112 of the content platform 110 can associate a media item with a document (e.g., a web page) that can includes a sharable address (e.g., a uniform resource locator (URL). Users can share the URL with other users. When the other users access the URL, they can be directed to the media item.

In implementations, the document can include metadata associated with the media item. For example, the metadata can include various information about the media item, such as a title, description, keywords, content type, width, height, a graphical representation associated with the media item (e.g., a thumbnail), an address, a username of an owner of the media item, a hashtag associated with the media item, an application name, one or more media item identifiers. The media item identifier can be an identifier for a page associated with the media item, such as a unique string identifier associated with the page (e.g., a canonical identifier, a canonical URL for the page, a non-canonical URL for the page). In some implementations, the media item identifier can be a channel identifier associated with the media item, and/or a playlist identifier associated with the media item. The metadata can also include a global comment indicator that indicates that the media item is to be presented with comments from multiple sources (e.g., multiple user devices).

In implementations, a canonical identifier for the page can be a base identifier or the minimum identifier that can be used to access the page. Additional strings can be added to the canonical identifier and still identify the page, but no shorter string can be used to identify the page. For example, a canonical URL for a page is: http://www.example.com/watch?PAGE_ID. A non-canonical URL (that includes the canonical URL) for the page can be used to access the page, such as http://www.example.com/watch?PAGE_ID/feature-ABC. In another example, a canonical identifier for a page is PAGE_ID and a non-canonical identifier for the page can be PAGE_ID&FEATURE_ID. Multiple unique identifiers can be associated with a page, such as an identifier for each media item loaded and/or played from the page, an identifier for a playlist that includes the media item, an identifier for a channel associated with the media item, etc. For example, a watch page that loads and plays a video has three unique string identifiers associated with it: 1) an identifier for the video loaded and played by the watch page (e.g., a video ID), 2) an identifier for a playlist associated with the identifier for the video (e.g., provides an identifier for the instance of the video in the playlist), and 3) an identifier for a channel that uploaded the video. In another example, a page for a playlist has a unique identifier for each media item in the playlist (e.g., video ID for each video in the playlist) and an identifier for the playlist (e.g., playlist ID). In implementations, the media item identifier is a hash of the media item. In implementations, the media item identifier can be encrypted.

In some implementations, the social platform 116 includes a social share manager 118 to provide global comments for presentation to a user. In other implementations (not shown), social share manager 118 can be part of the content platform 110. In yet other implementations, social share manager 118 can be part of the social platform 116 and can cooperate with the content platform 110 (media item manager 112) to provide global comments for presentation to a user.

The social share manager 118 can allow a user to submit a request to share a media item. For example, the social share manager 118 can provide a graphical user interface (GUI) that permits the user to input a media item share request. The request can include a URL of a page associated with the media item. The media item can be stored/managed by the content platform 110.

In implementations, the social share manager 118 may receive a request to share a media item. The request to share the media item can include an identifier for a page associated with the media item, such as a URL associated with the page. The page can be a watch page associated with the media item, a page for a playlist with multiple media items, a page that loads and plays or causes a player to load and play a media item, a page for a channel that is associated with one or more media items, a page for a channel that is associated with a media item, a social network page associated with a media item, a news website or article associated with a media item, etc.

After receiving a request to share a media item, the social share manager 118 can determine whether the media item is to be presented with comments from multiple social shares. For example, when multiple users post the same video on the social platform 116, even when each post is created as a separate instance, comments from each of the posts can be aggregated between the posts. To determine whether the media item is associated with comments from different social shares, the social share manager 118 can obtain an identifier of the media item. The identifier of the media item can be unique to the media item and can be a canonical URL, as described herein. The social share manager 118 can obtain the media item identifier by accessing metadata associated with the media item. To access the metadata, the social share manager 118 can access the URL submitted by the user. The URL can be an address of a page that includes the metadata. For example, the media item identifier can be contained in a watch page document that is associated with the media item. The social share manager 118 can scrape the page to obtain the metadata and the media item identifier. The social share manager 118 can then use the media item identifier to search a comment data store (e.g., comment data store 150) to obtain comments associated with the media item identifier. The comment data store can be managed by the content platform 110 or by the social platform 116. For example, the data store 150 can be a database and the social share manager 118 can use the media item identifier as a key to identify comments associated with the media item. The social share manager 118 can obtain any identified comments from the comment data store 150. Once the social share manager 118 obtains comments associated with the media item, the social share manager 118 can present the comments in association with the social share that includes the media item. For example, the social share manager 118 can present the social share and the comments via a comment area of a GUI of the client device 105.

In implementations, when determining whether to present comments from other social shares with the media item, the social share manager 118 can parse the metadata of the media item to find a global comment indicator. Upon detecting the global comment indicator, the social share manager 118 can determine to present comments from other social shares with the media item.

In some implementations, when determining whether to present comments from other social shares with the media item, the social share manager 118 can search the comment data store 150 using the media item identifier. When no comments are identified, the social share manager 118 can determine to not present comments from other social shares with the media item. When at least one comment is identified, the social share manager 118 can determine to present comments from other social shares with the media item.

In some implementations, the social share manager 118 can use additional factors when determining whether the media item is to be presented with comments from multiple social shares. Additional factors can include a time since last receiving a comment associated with the media item, a time that the media item was uploaded, a threshold amount of view, likes or shares for the media item, an amount of shares, views likes in a predetermined amount of time, etc. For example, the social share manager 118 may determine that a media item should not be presented with comments from multiple social shares when the media item was uploaded at a time that exceeds a threshold amount of time. In another example, the social share manager 118 may determine to present media item with comments from multiple social shares when the media item has been accessed or viewed more than a threshold number of times. In a further example, the social share manager 118 may determine to present media item with comments from multiple social shares when the media item has been accessed or viewed more than a threshold number of times within a predetermined amount of time.

In implementations, the social share manager 118 receives a new comment from a user device, which can receive the new comment via a comment area of a GUI. The social share manager 118 can associate the new comment with the identifier media item identifier. The social share manager 118 can submit the new comment to the comment data store 150 where it can be stored in association with the media item identifier. In implementations, the social share manager 118 can present the new comment, such as in the comment area of the GUI of the client device 105.

In some implementations, the social share manager 118 can present the comments in a chat room. When determining whether to present comments from other social shares with the media item, the social share manager 118 can consider a current population of an existing chat room. For example the social share manager 118 may not present a chat room when the current population exceeds a threshold. The social share manager 118 may prioritize chat rooms with fewer users or chat rooms with recent user activity. The social share manager 118 may also prioritize chat rooms where a particular user is already present. Once the chat room is displayed to a user, the user may have access to additional controls to change which chat room to join. In some implementations, when a user adds a comment to a chat room, this may generate an automatic feed event or a social share. For example, the social share manager 118 can generate a new social share and presented the new social share in a feed of other users when a user adds a comment, which can encourage more users to join the chat room. In implementations, the new social share may exclude specific comments of the chat room and merely mention that the user "commented on" or "chatted about" a particular subject within the chat room.

In implementations, the social share manager 118 may not receive the media item identifier from metadata in a page associated with the media item. When the social share manager 118 does not obtain the media item identifier from the metadata, the social share manager 118 can derive the identifier of the media item by obtaining a page ID (e.g., from the metadata) that is associated with the media item and determining a base unique identifier that can be used to identify the media item. In one implementation, the social share manager 118 determines the base unique identifier by updating the page ID by removing portions of the page ID and accessing the page associated with the updated page ID. If the updated page ID accesses the same page, the social share manager 118 continues removing portions of the page ID until the page is not accessible using the updated page ID. Upon not being able to access the page with the updated page ID, the social share manager 118 can revert to the previous page ID that worked and determine that is the base unique identifier for the media item. For example, if the metadata can include a page ID http://www.example.com/watch?v=9bZkp7q19f0\this_is_extra, the social share manager 118 removes the "this_is_extra" portion of the page ID and accesses the page. In this example, the page is accessible and social share manager 118 determines that http://www.example.com/watch?v=9bZkp7q19f0 is the identifier of the media item.

In implementations, the social share manager 118 can obtain the identifier of the media item by requesting the identifier of the media item from a content server (e.g., content platform 110), from a data store, from a site associated with the social share, etc.

Although each of content platform 110, social platform 116 and data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices. Implementations of the disclosure may operate within a single server device or on multiple server devices. Implementations of the disclosure may operate as a stand-alone system. In some implementations, the content platform 110 and the social platform 116 are managed by a single entity. In some implementations, the content platform 110 and the social platform 116 are managed by different entities.

In situations in which the systems discussed here collect personal information about users, or may make use of personal information, the users may be provided with an opportunity to control whether the content platform 110 collects user information (e.g., information about a user's social network, social actions or activities, profession, a user's preferences, or a user's current location), or to control whether and/or how to receive content from the content platform 110 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content platform 110.

Figure 2:
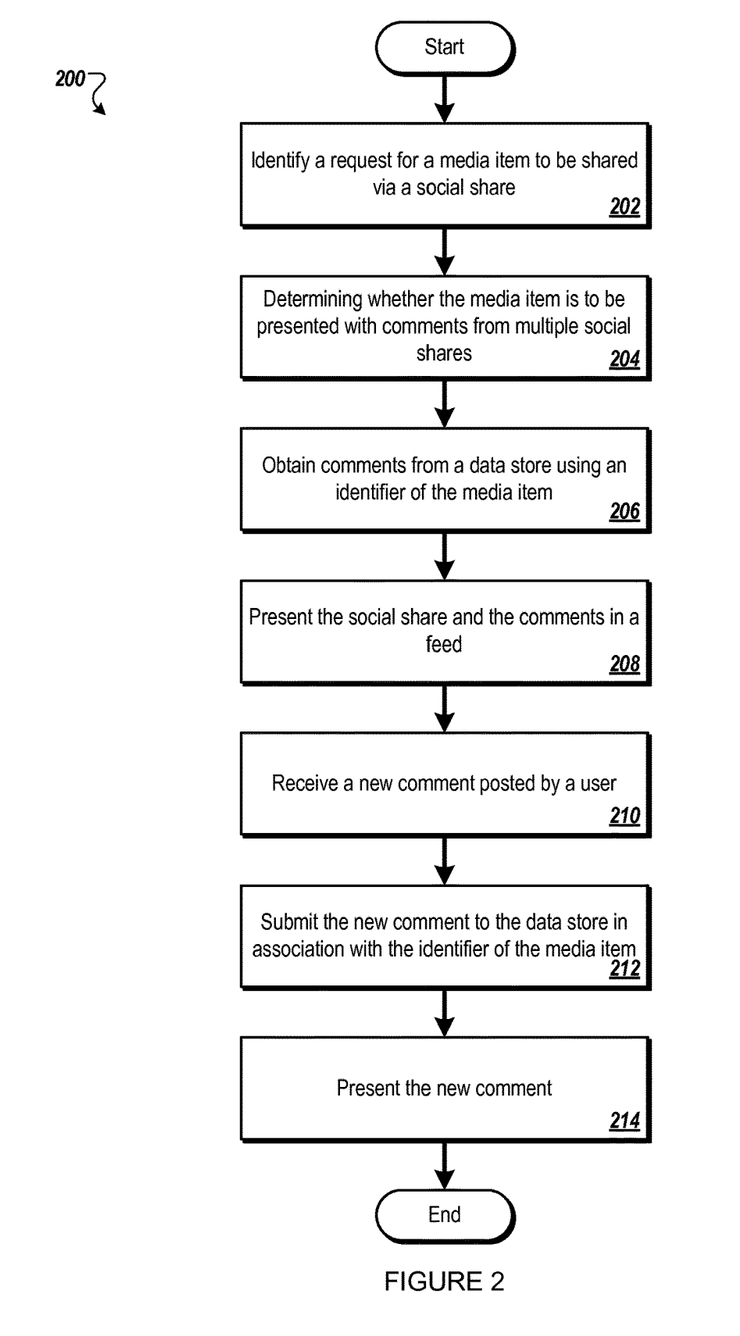
FIG. 2 is a flow diagram illustrating a method 200 for providing global comments for a media item, according to some implementations of the disclosure.

FIG. 2 is a flow diagram illustrating a method 200 for providing global comments for a media item, according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a social share manager, such as the social share manager 118, as further described in conjunction with FIG. 1.

Referring to FIG. 2, method 200 begins at block 202 when processing logic identifies a request for a media item to be shared via a social share. The processing logic can receive the request from a user via a graphical user interface of a user device.

At block 204, the processing logic determines whether the media item is to be presented with a plurality of comments from a plurality of social shares. The plurality of social shares can correspond to posts submitted on at least one of a social network site or a content hosting site. When determining whether the media item is to be presented with a plurality of comments from a plurality of social shares, the processing logic can obtain an identifier of the media item, as described in more detail conjunction with FIG. 1. Then, the processing logic can search a data store (e.g., comment data store 150 of FIG. 1) using the media item identifier to determine whether the data store contains comments associated with the identifier of the media item. In implementations, when determining whether the media item is to be presented with a plurality of comments from a plurality of social shares, the processing logic can parse metadata of the media item to find a global comment indicator. The global comment indicator can indicate that the media item should be presented with a plurality of comments from a plurality of social shares. The global comment identifier can also include a location (e.g., a URL of a data store) for where to obtain the comments from the plurality of social shares. At block 206, the processing logic obtains the plurality of comments from a data store using a media item identifier for presentation to a user in response to a determination that the media item is to be presented with the plurality of comments from the plurality of social shares.

At block 208, the processing logic optionally presents a new social share that includes the media item. The processing logic can present, in a GUI, the plurality of comments in association with the social share.

At block 210, the processing logic receives a new comment posted by the user, such as via the GUI. At block 212, the processing logic submits the new comment to a data store (e.g., comment data store 150 of FIG. 1) in association with the identifier of the media item. At block 214, the processing logic optionally presents the new comment, such as via a GUI.

Figure 3:
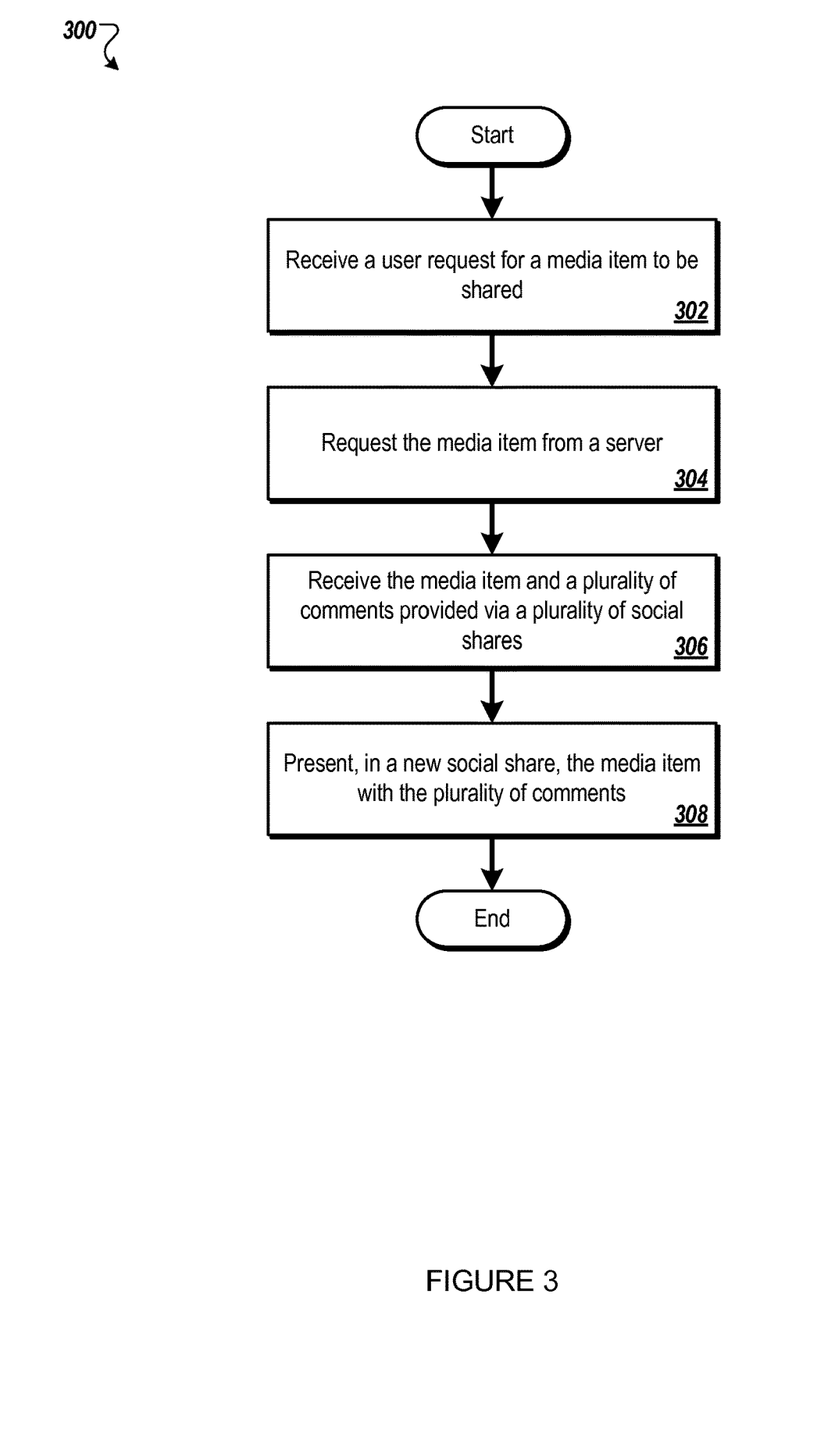
FIG. 3 is a flow diagram illustrating a method 300 for providing global comments for a media item on a client device, according to some implementations of the disclosure

FIG. 3 is a flow diagram illustrating a method 300 for providing global comments for a media item on a client device, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In implementations, the method 300 is performed by a client device (e.g., the client device 104 of FIG. 1).

At block 302, the processing logic receives a user request for a media item to be shared. The processing logic can receive the request from a user via a graphical user interface. At block 304, the processing logic requests the media item from a server (e.g., from content platform 110 of FIG. 1).

At block 306, the processing logic receives, from the server, the media item and a plurality of comments provided via a plurality of social shares. In implementations, the processing logic receives the comments from a comment data store, such as the comment data store 150 of FIG. 1.

At block 308, the processing logic presents, in a new social share, the media item with the plurality of comments. The processing logic can present the new social share as a new instance of the social share within a feed.

In implementations, the processing logic can present multiple social shares and each social share can include a respective comment area. In some implementations, the processing logic can present one comment area for global comments within a visible portion of a GUI at a time. To determine which social share is to include the global comment area, the processing logic can use any number of factors, including: which social share is central to a user's view within a GUI, a type of social share, an availability of one or more chat rooms, a number of chat rooms on a screen and their locations, how recent a social share was posted, a past interaction of users with the social share, a current user interaction with the social share (e.g., a chat room appears after the user "likes" the social share).

Figure 4:
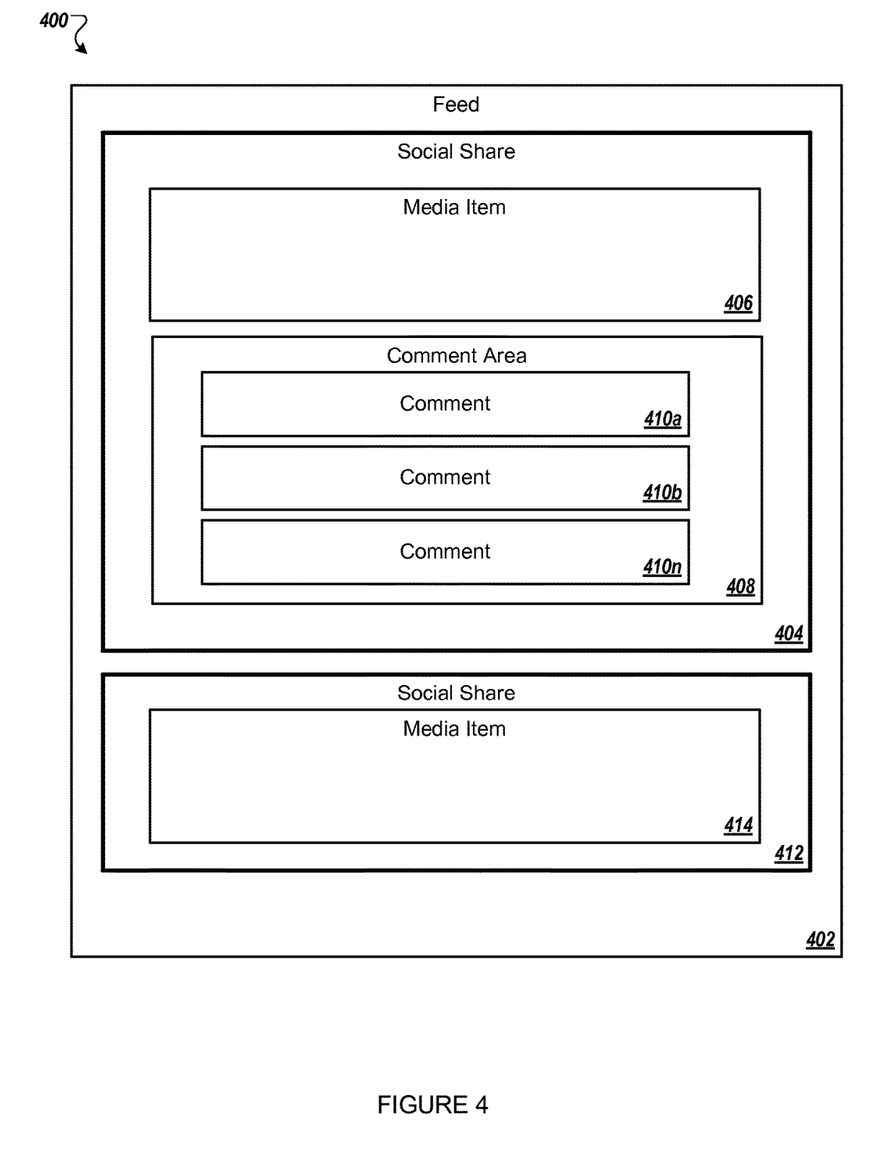
FIG. 4 is an example user interface 400 in accordance with one implementation of the present disclosure

FIG. 4 is an example user interface 400 in accordance with one implementation of the present disclosure. For example, the user can be presented with the user interface 400 when viewing a feed 402, such as a social feed. The user interface 400 can be provided to a user via a web browser, an application (e.g., a mobile app), embedded in a third party web page, etc.

The user interface 400 includes feed 402 that includes multiple social shares, each pertaining to a different media item (e.g., social share 404 pertaining to media item 406 and a social share 412 pertaining to another media item 414). The media item 406 can be a video, an audio file, a blog, etc. as described herein. Social share 404 represents a social share with global comments. It includes a reference to media item 406 that can be represented by the media item itself, a thumbnail of the media item, a link to the media item, etc. Social share 404 can include a comment area 408 that includes global comments 410a-n that were originally provided via multiple social shares. The comments 410a-n can be from multiple users entered via different user devices. The comment area 408 can also include a GUI element to receive new input (e.g., a new comment) from a user.

In implementations, both social share 404 and a social share 412 each have associated comment areas. Alternatively, the feed can include one visible comment area at a time. In implementations, a social share can include multiple comment areas, one of which can be a for a live-chat environment. In implementations, a social share can include multiple comment areas, one of which can be global comments. In some implementations, the feed can be a list of search results that can be presented to a user in response to receiving a search term from the user. A comment area 408 can be presented with one or more of the search results.

Figure 5:
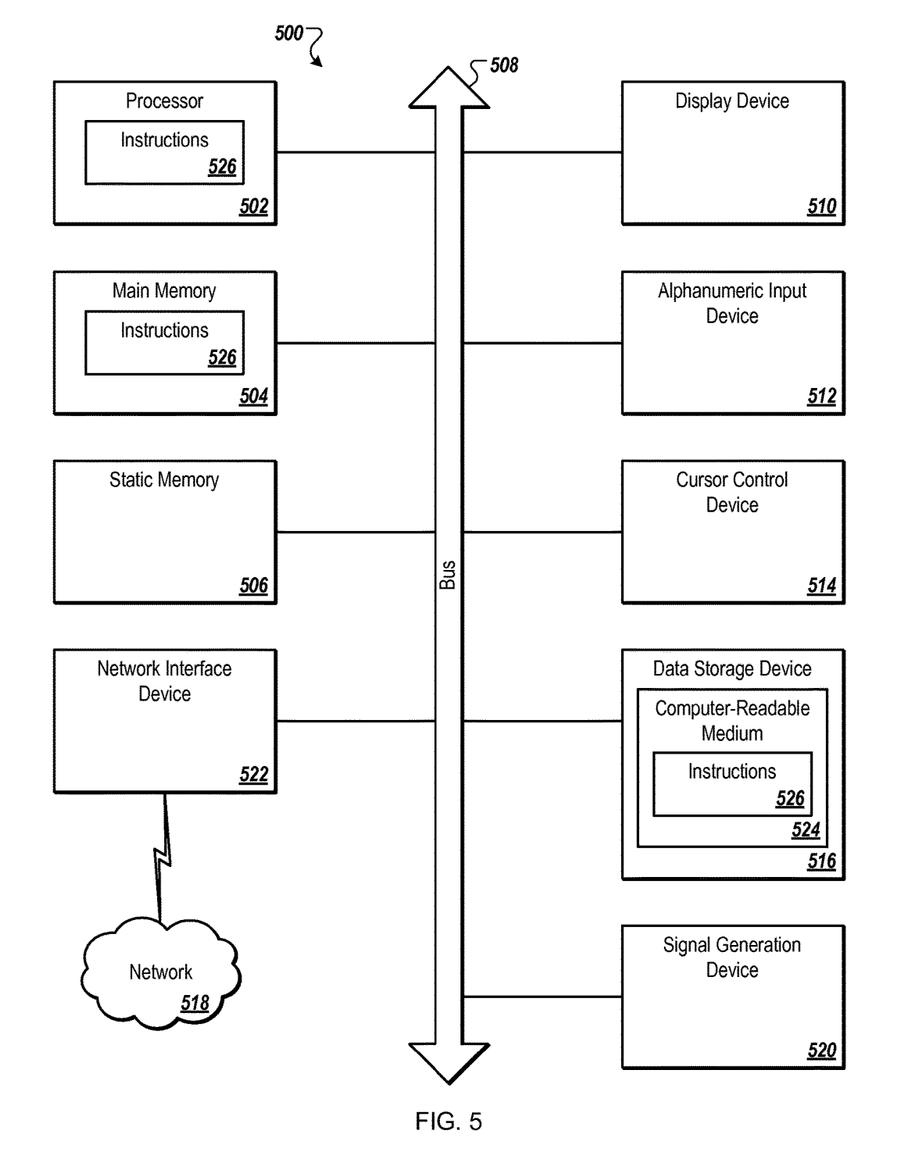
FIG. 5 is a block diagram of an example computer system that may perform one or more of the operations described herein.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 518 via the network interface device 522.

In one implementation, the instructions 526 include instructions for a social share manager, which may correspond to the social share manager 118 described with respect to FIG. 1, and/or a software library containing methods that provide a social share manager. While the computer-readable storage medium 524 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

identifying a request of a first user to share a media item with a first plurality of users of a content sharing service that are associated with the first user, the request of the first user resulting in a first social share of the media item;

determining, by a processing device, whether the media item is to be presented with a plurality of comments associated with a second social share of the media item, which resulted from a request of a second user to share the media item with a second plurality of users of the content sharing service that are associated with the second user, wherein the second social share of the media item is not provided for presentation to the first user, wherein the first social share of the media item is not provided for presentation to the second user, and wherein determining whether the media item is to be presented with the plurality of comments associated with the second social share of the media item comprises:

parsing metadata associated with the media item to find a global comment indicator that indicates that the plurality of comments associated with the second social share of the media item are to be presented with the first social share of the media item;

in response to determining, based on the global comment indicator, that the media item is to be presented with the plurality of comments associated with the second social share of the media item, obtaining the plurality of comments associated with the second social share of the media item from a data store using an identifier of the media item;

identifying a chat room to present with the media item;

providing the media item, the chat room, and the plurality of comments associated with the second social share of the media item to a user device for presentation in the chat room;

receiving a new comment posted by a third user in the chat room; and responsive to receiving the new comment posted by the third user in the chat room, generating a new social share for presentation in a feed of a fourth user rather than in the chat room, wherein the new social share indicates the third user posted the new comment in the chat room.

2. The method of claim 1, wherein determining whether the media item is to be presented with the plurality of comments associated with the second social share of the media item, further comprises:

obtaining the identifier of the media item; and searching the data store using the identifier of the media item to determine whether the data store contains comments associated with the identifier of the media item.

3. The method of claim 1, wherein the identifier of the media item comprises a canonical uniform resource locator (URL).

4. The method of claim 1, wherein the identifier is a hash of the media item or an encrypted identifier of the media item.

5. The method of claim 1, wherein the identifier of the media item is contained in a watch page document associated with the media item.

6. The method of claim 1, further comprising:
submitting the new comment to the data store in association with the identifier of the media item, wherein the new comment is posted by the third user during the presentation of the media item and is presented with the plurality of comments in the chat room.

7. The method of claim 1, wherein the second social share of the media item corresponds to a post submitted by the second user on the content sharing service.

8. The method of claim 1 further comprising:
causing a presentation, in a graphical user interface (GUI), of a new social share comprising the media item; and
causing a presentation, in the GUI, of the plurality of comments in association with the new social share.

9. A non-transitory computer readable storage medium having instructions that, when executed by a processing device, cause the processing device to perform operations comprising:
identifying a request of a first user to share a media item with a first plurality of users of a content sharing service that are associated with the first user, the request of the first user resulting in a first social share of the media item;
determining, by the processing device, whether the media item is to be presented with a plurality of comments associated with a second social share of the media item, which resulted from a request of a second user to share the media item with a second plurality of users of the content sharing service that are associated with the second user, wherein the second social share of the media item is not provided for presentation to the first user, wherein the first social share of the media item is not provided for presentation to the second user, and wherein determining whether the media item is to be presented with the plurality of comments associated with the second social share of the media item comprises:
parsing metadata associated with the media item to find a global comment indicator that indicates that the plurality of comments associated with the second social share of the media item are to be presented with the first social share of the media item;
in response to determining, based on the global comment indicator, that the media item is to be presented with the plurality of comments associated with the second social share of the media item, obtaining the plurality of comments associated with the second social share of the media item from a data store using an identifier of the media item;
identifying a chat room to present with the media item;
providing the media item, the chat room, and the plurality of comments associated with the second social share of the media item to a user device for presentation in the chat room;
receiving a new comment posted by a third user in the chat room; and
responsive to receiving the new comment posted by the third user in the chat room, generating a new social share for presentation in a feed of a fourth user rather than in the chat room, wherein the new social share indicates the third user posted the new comment in the chat room.

10. The non-transitory computer readable storage medium of claim 9, wherein determining whether the media item is to be presented with the plurality of comments associated with the second social share of the media item, further comprises:
obtaining the identifier of the media item; and
searching the data store using the identifier of the media item to determine whether the data store contains comments associated with the identifier of the media item.

11. The non-transitory computer readable storage medium of claim 9, wherein the identifier of the media item comprises a canonical uniform resource locator (URL).

12. The non-transitory computer readable storage medium of claim 9, wherein the second social share of the media item corresponds to a post submitted by the second user on the content sharing service.

13. The non-transitory computer readable storage medium of claim 9, the operations further comprising:
causing a presentation, in a graphical user interface (GUI), of a new social share comprising the media item; and
causing a presentation, in the GUI, of the plurality of comments in association with the new social share.

14. A computing device comprising:
a memory; and
a processing device, coupled to the memory, wherein the processing device is to:
identify a request of a first user to share a media item with a first plurality of users of a content sharing service that are associated with the first user, the request of the first user resulting in a first social share of the media item;
determine whether the media item is to be presented with a plurality of comments associated with a second social share of the media item, which resulted from a request of a second user to share the media item with a second plurality of users of the content sharing service that are associated with the second user, wherein the second social share of the media item is not provided for presentation to the first user, wherein the first social share of the media item is not provided for presentation to the second user, and wherein to determine whether the media item is to be presented with the plurality of comments associated with the second social share of the media item, the processing device to:
parse metadata associated with the media item to find a global comment indicator that indicates that the plurality of comments associated with the second social share of the media item are to be presented with the first social share of the media item;
in response to determining, based on the global comment indicator, that the media item is to be presented with the plurality of comments associated with the second social share of the media item, obtain the plurality of comments associated with the second social share of the media item from a data store using an identifier of the media item;

identify a chat room to present with the media item;

provide the media item, the chat room, and the plurality of comments associated with the second social share of the media item to a user device for presentation;

receive a new comment posted by a third user in the chat room; and responsive to receiving the new comment posted by the third user in the chat room, generate a new social share for presentation in a feed of a fourth user rather than in the chat room, wherein the new social share indicates the third user posted the new comment in the chat room.

15. The computing device of claim 14, wherein to determine whether the media item is to be presented with the plurality of comments associated with the second social share of the media item, the processing device is to:

obtain the identifier of the media item; and search the data store using the identifier of the media item to determine whether the data store contains comments associated with the identifier of the media item.

16. The computing device of claim 14, the processing device further to:

submit the new comment to the data store in association with the identifier of the media item, wherein the new comment is posted by the third user during the presentation of the media item and is presented with the plurality of comments in the chat room.

17. The computing device of claim 14, wherein the processing device is further to:

cause a presentation, in a graphical user interface (GUI), of a new social share comprising the media item; and cause a presentation, in the GUI, of the plurality of comments in association with the new social share.

* * * * *